US009361879B2

(12) United States Patent
Morris et al.

(10) Patent No.: US 9,361,879 B2
(45) Date of Patent: Jun. 7, 2016

(54) WORD SPOTTING FALSE ALARM PHRASES

(75) Inventors: Robert W. Morris, Atlanta, GA (US);
Jon A. Arrowood, Smyrna, GA (US);
Mark A. Clements, Lilburn, GA (US);
Kenneth King Griggs, Roswell, GA (US); Peter S. Cardillo, Atlanta, GA (US); Marsal Gavalda, Sandy Springs, GA (US)

(73) Assignee: NEXIDIA INC., Atlanta, GA (US)

(*) Notice: Subject to any disclaimer, the term of this patent is extended or adjusted under 35 U.S.C. 154(b) by 1177 days.

(21) Appl. No.: 12/391,395

(22) Filed: Feb. 24, 2009

(65) Prior Publication Data

US 2010/0217596 A1    Aug. 26, 2010

(51) Int. Cl.
| | | |
|---|---|---|
| *G10L 15/10* | (2006.01) | |
| *G10L 15/187* | (2013.01) | |
| *G10L 25/54* | (2013.01) | |
| *G10L 15/08* | (2006.01) | |

(52) U.S. Cl.
CPC ............ *G10L 15/10* (2013.01); *G10L 15/187* (2013.01); *G10L 25/54* (2013.01); *G10L 2015/088* (2013.01)

(58) Field of Classification Search
CPC ..... G10L 15/22; G10L 15/265; G10L 15/187; G10L 15/08; G10L 2015/088; G10L 15/30; G10L 15/04; G10L 15/183; G10L 15/10; G10L 15/00; G10L 2015/025; G10L 2015/085; G10L 25/54
USPC .................. 704/251, 252, 254, 270
See application file for complete search history.

(56) References Cited

U.S. PATENT DOCUMENTS

| | | | | |
|---|---|---|---|---|
| 7,107,204 | B1* | 9/2006 | Liu et al. ............................. 704/2 |
| 7,263,484 | B1* | 8/2007 | Cardillo et al. .................. 704/236 |
| 7,599,475 | B2* | 10/2009 | Eilam et al. .................. 379/88.09 |
| 7,640,161 | B2* | 12/2009 | Morris et al. ..................... 704/258 |
| 2002/0022960 | A1* | 2/2002 | Charlesworth ........... G10L 15/12 704/251 |
| 2003/0187649 | A1* | 10/2003 | Logan ............... G06F 17/30017 704/260 |
| 2004/0024599 | A1* | 2/2004 | Deisher ......................... 704/256 |
| 2006/0206324 | A1* | 9/2006 | Skilling et al. ................. 704/231 |
| 2006/0217966 | A1* | 9/2006 | Hu et al. ......................... 704/200 |
| 2007/0033003 | A1* | 2/2007 | Morris ............................... 704/9 |
| 2007/0038450 | A1* | 2/2007 | Josifovski ......... G06F 17/30265 704/255 |
| 2007/0055525 | A1* | 3/2007 | Kennewick ............. G10L 15/08 704/257 |
| 2007/0179784 | A1* | 8/2007 | Thambiratnam et al. ..... 704/255 |
| 2007/0271241 | A1* | 11/2007 | Morris et al. ..................... 707/3 |
| 2008/0133239 | A1* | 6/2008 | Jeon ........................ G10L 15/187 704/254 |

(Continued)

OTHER PUBLICATIONS

Morris et al. "Scoring Algorithms for Wordspotting Systems" 2004.*

(Continued)

*Primary Examiner* — James Wozniak
(74) *Attorney, Agent, or Firm* — Pearl Cohen Zedek Latzer Baratz LLP (57) ABSTRACT

In one aspect, a method for processing media includes accepting a query. One or more language patterns are identified that are similar to the query. A putative instance of the query is located in the media. The putative instance is associated with a corresponding location in the media. The media in a vicinity of the putative instance is compared to the identified language patterns and data characterizing the putative instance of the query is provided according to the comparing of the media to the language patterns, for example, as a score for the putative instance that is determined according to the comparing of the media to the language patterns.

24 Claims, 3 Drawing Sheets

(56) References Cited

U.S. PATENT DOCUMENTS

2009/0043581 A1* 2/2009 Abbott et al. ............... 704/254
2010/0082343 A1* 4/2010 Levit et al. .................. 704/257

OTHER PUBLICATIONS

Moreau et al. "Phonetic Confusion Based Document Expansion for Spoken Document Retrieval" 2004.*
Logan et al. "Confusion-Based Query Expansion for OOV Words in Spoken Document Retrieval" 2002.*
Mamou et al. "Phonetic Query Expansion for Spoken Document Retrieval" Sep. 2008.*
Sharp et al. "The Watson Speech Recognition Engine" 1997.*
Cardillo et al. "Phonetic Searching vs. LVCSR: How to Find What You ReallyWant in Audio Archives" 2002.*
Leath. "Audient: An Acoustic Search Engine" 2005.*
Pinto et al. "Exploiting Phoneme Similarities in Hybrid HMM-ANN Keyword Spotting" 2007.*
Clements et al. "Voice/Audio Information Retrieval: Minimizing the Need for Human Ears" 2007.*
Wechsler, Martin. "Spoken document retrieval based on phoneme recognition". Diss. ETH No. 12879, Zurich, 1998, pp. 1-121.*
Brown, M. G., et al. "Open-vocabulary speech indexing for voice and video mail retrieval." Proceedings of the fourth ACM international conference on Multimedia. ACM, 1997, pp. 1-10.*
Kessens, et al. "Improving the performance of a Dutch CSR by modeling within-word and cross-word pronunciation variation." Speech Communication 29.2, Nov. 1999, pp. 193-207.*
Seman, et al. "Acoustic pronunciation variations modeling for standard Malay speech recognition." Computer and Information Science 1.4, Nov. 2008, pp. 112-120.*

* cited by examiner

WORD SPOTTING FALSE ALARM PHRASES

BACKGROUND

This invention relates to false alarm phrases in word spotting.

Word spotting systems can be used to locate queries in media, for example, in multimedia files with audio components. In a word spotting system, a search query and a body of media are processed to determine locations in the media that most likely match the query. Such matches are referred to as putative hits (putative instances) of the query. Among these putative hits usually will be a set of false positives ("false alarms"), which are hits that do not correspond to actual occurrences of the query. There are a number of factors that may contribute to false positives. For example, the speech associated with a false positive may be phonetically similar to the search query yet not represent the desired query. This similarity may not be predictable or obvious to the user, for example, because the false hit may not occur at true word boundaries in the media.

SUMMARY

In one aspect, in general, a method for processing media includes accepting a query. One or more language patterns are identified that are similar to the query. A putative instance of the query is located in the media. The putative instance is associated with a corresponding location in the media. The media in a vicinity of the putative instance is compared to the identified language patterns and data characterizing the putative instance of the query is provided according to the comparing of the media to the language patterns.

Aspects may include one or more of the following features.

Providing data characterizing the putative instance includes providing data representing a visual display of the putative instance and at least some of the language patterns A score for the putative instance is determined according to the comparing of the media to the language patterns.

Locating the putative instance includes determining a match score of the query to the media at the location of putative instance. Comparing the media in a vicinity of the putative instance to the identified language patterns may then include determining a match score for each of the language patterns to the media in the vicinity of the putative instance.

Determining the score for the putative instance according to the comparing of the media to the language patterns may include combining the match score for the query and match scores for one or more of the language patterns.

A specification of at least some of the one or more patterns is accepted with a specification of the query and/or at least some of the patterns are identified as phonetically similar to at least a portion of the query.

Identifying the one or more language patterns that are similar to the query includes combining word information and phoneme substitution information with a phonetic representation of the query.

Identifying the one or more language patterns that are similar to the query includes one or more of (a) identifying language patterns that include a portion that is phonetically similar to the query, (b) identifying one or more word sequences, and (c) identifying at least one language pattern such that the query is similar to a portion less than the entire language pattern.

Identifying of the one or more language patterns is performed prior to locating the putative instance of the query.

The one or more language patterns are presented to a user from whom the query is accepted. Presenting the one or more patterns to the user may include determining a degree of similarity of each of the patterns to the query.

Comparing the media in a vicinity of the putative instance to the identified language patterns is performed after locating the putative instance.

Data representing the putative instance and at least some of the language patterns is provided, and an indicator that one of the language patterns represents the media in the location of the query is then accepted. A configuration of a wordspotting engine may then be adapted according to the accepted indicator to improve an accuracy of locating further putative instances of the query.

Identifying the one or more language patterns that are similar to the query includes accepting a specification of at least some of said patterns with a specification of the query. For instance, a query term may be represented as a specification of a first term and one or more other terms, the other terms corresponding to the language patterns that are similar to the query.

The one or more language patterns phonetically similar to the query are represented as a finite state transducer.

Identifying one or more language patterns phonetically similar to the query includes selecting N best language patterns from representation of a larger set of language patterns. The representation of the larger set of language patterns may include a finite-state transducer and selecting the N best language patterns comprises identifying multiple paths through the transducer.

In another aspect, in general, software stored on computer-readable media includes instructions for causing a data processing system to: accepting a query; identify one or more language patterns that are similar to the query; locate a putative instance of the query in the media, the putative instance being associated with a corresponding location in the media; compare the media in a vicinity of the putative instance to the identified language patterns; and determine a score for the putative instance according to the comparing of the media to the language patterns.

In another aspect, in general, a media processing system includes a module for identifying one or more language patterns that are similar to a query. The system further includes a word spotting module including a first word spotting component for accepting media and locating a putative instance of the query in the media, the putative instance being associated with a corresponding location in the media, and a second component for comparing the media in a vicinity of the putative instance to the identified language patterns and determining a score for the putative instance according to the comparing of the media to the language patterns.

Other features and advantages of the invention are apparent from the following description, and from the claims.

DESCRIPTION

As an example of a type of false alarm that may occur in word spotting, consider the diagram below, which illustrates a putative hit for a user query of "Burma" that is detected in error by the word spotting system at a location at which the phrase "labor market" is present in the media. In this case, the word spotting system may produce a relatively high score reflecting a high probability of the query matching the media starting at the second syllable of "labor" and end in the first syllable of "market". To a user, this high score may look suspicious if the audio in the vicinity of the putative hit is listened to and it may not be obvious why the system returned the result since the hit occurs in the middle of words. This can result in a loss of confidence in the word spotter.

Note that in this the example, in which an instance of "labor market" triggers a false positive, the phonetic transcription of "Burma" is very similar to a sub-sequence of the phonetic transcription of "labor market":

| Media | Labor | | | market | | | | |
|---|---|---|---|---|---|---|---|---|
| Transcript | l | ey | b | er | m | aa | r | k | ah | t |
| Search Query | | | b | er | m | ah | | | |
| | | | | | Burma | | | | |

In the description below, phrases of the type of "labor market" above are referred to as "decoy phrases." Generally, a decoy phrase for a query is a phrase that includes a portion that is expected to be acoustically similar to the query and thus attract putative hits that are false alarms for the query.

In some examples, the more a particular decoy phrase occurs in the target language (i.e., in the language of the unknown speech being processed), then the more likely that a putative hit will actually correspond to that decoy phrase (i.e., the putative hit is a false positive or a false alarm). That is, the false alarm rate for the query with a common decoy may be high.

In various embodiments described below, for a particular query, automatic determination of likely decoy phrases for that query is used in one or more of a variety of ways. These include:

Identification of likely decoys to a user at the time that a query is specified by the user. In some examples, the user may select a different query that has fewer common decoy phrases and may serve the user's purposes equally as well. In some examples, the user may augment the query to explicitly specify that the query is "not like" one or more of the identified decoy phrases.

Automatic processing of putative hits for a query in view of the probable decoy phrases, for example, to determine scores for the putative hits that take account for how well one or more decoy phrases also match the vicinity of the putative hit.

High-scoring decoy phrases are presented to the user along with putative hits. In some examples, the user can then select one of these decoy phrases if they are correct (for example, based on listening to the media in the vicinity of the putative hit), and the system makes use of these selections to adapt the system (e.g., the wordspotting engine parameters, or the query phonetic representation) to improve the accuracy of further searches.

Figure 1:
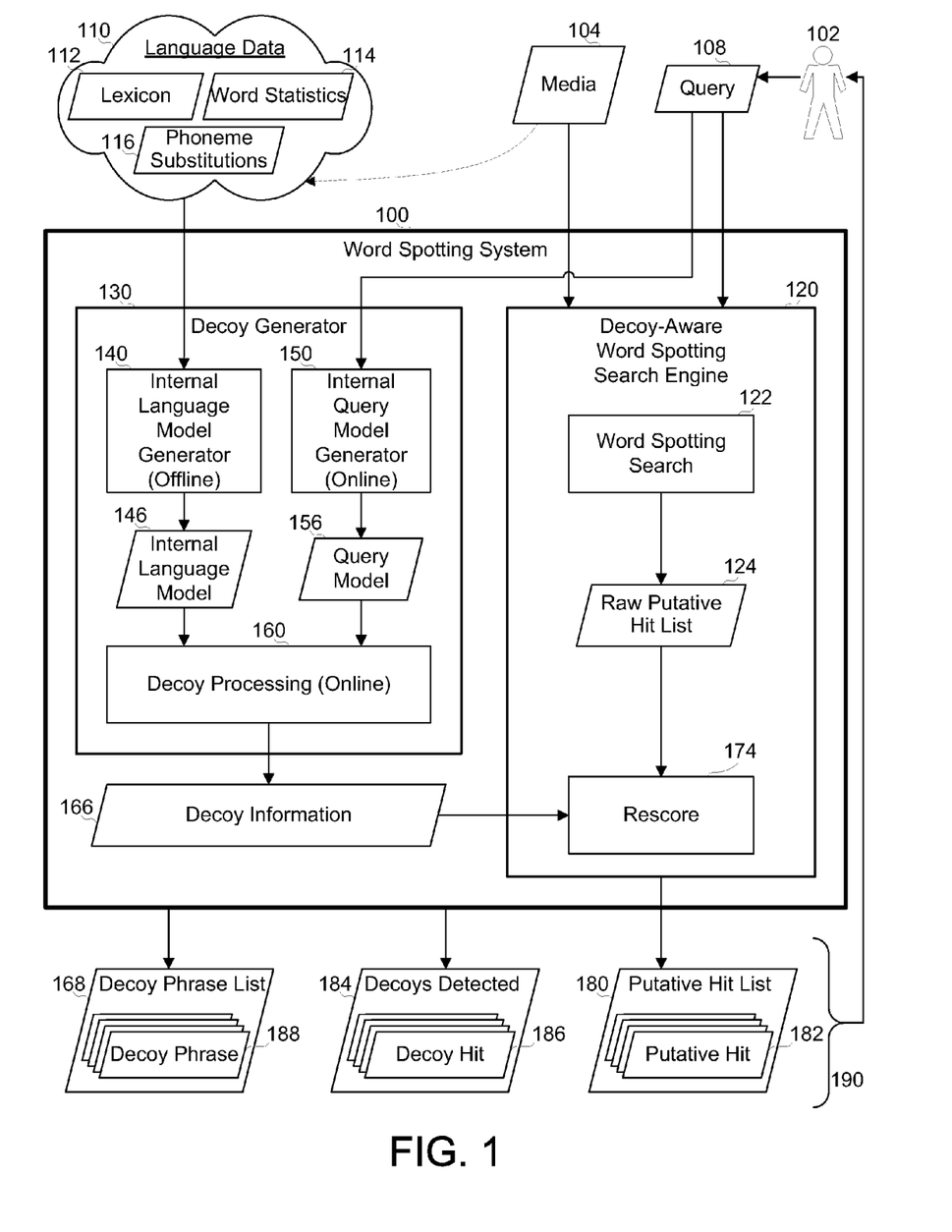
FIG. 1 is a block diagram of a word spotting system.

Referring to FIG. 1, in an exemplary embodiment using a word spotting system 100, a user 102 searches a media 104 for a query 108. The user 102 supplies the word spotting system 100 with the input query 108 and, using a procedure described in detail below, the system produces a putative hit list 180, which represents a set of automated detections of the query 108 in the media 104. The media is supplied to the system, for example as a data file or stream representing recorded audio, either by the user or by some other configuration. Generally, the putative hit list 180 is returned (block 190) to the user 102, for example, as time indices to the media or in a graphical presentation that allows the user to select putative hits for listening or further analysis.

In procedures related to determining decoys for the user's query, the word spotting system 100 includes a decoy generator 130 which uses language data 110 to process the query 108 to form decoy information 166, which is then used in processing of the media 104 to form the putative hit list 180. Generally, the decoy information 166 characterizes language-based decoy events that are similar to the query in that putative hits for the query may actually correspond to one of the decoy event. One type of decoy event is a sequence of words such that the query may be similar to all or part of an instance of the decoy event. In some embodiments, decoys detected 184 are also returned to the user 102.

The word spotting system 100 includes a decoy-aware word spotting engine 120 which receives the user's query 108 and the generated decoy information 166. The decoy-aware word spotting engine 120 includes a word spotting search 122 module, which scans the media 104 based on the query and detects putative instances of the query forming a raw putative hit list 124, with each putative hit including a score representative of a likelihood that the putative hit is a true detection of the query. In some embodiments, a word spotting engine as described in U.S. Pat. No. 7,263,484, "Phonetic Searching," (which is incorporated herein by reference) is used. The raw putative hit list 124 is then processed accord to the decoy information 166. In some embodiments, each hit in the raw list 124 is rescored (block 174) to account for the potential that they are false positives. Generally, a putative hit with a high rescore represents a location in the media that has a high likelihood of matching the query and a lower likelihood of matching a decoy. In some embodiments, the rescoring using the decoy information is performed after a complete search for raw putative hits, while in other embodiments, the processing is performed concurrently or in a pipelined manner with the word spotting search for the query (e.g., as raw putative hits are found).

In some examples, the decoy information 166 is derived by the decoy generator 130 from language data 110. The language data includes various types of information. These include a language lexicon 112 representing words known in the language along with their phonetic representation. The language data 110 also includes word statistics 114, which represents sequence word and/or word sequences usage statistics. In some examples, the word statistics 114 includes frequencies of words in the lexicon. In some embodiments, the word statistics includes word sequence statistics, for example, which characterize probabilities of specific words following precedent words. Such sequence statistics are often referred to as N-gram statistics. The language data 110 also includes phoneme substitutions 116, which represents confusability of particular pairs of phoneme, for example representing a degree of confusability of AA and AH. The phoneme substitutions may also be represented as confusion probabilities. In some implementations the phoneme substitutions 116 also represent confusability of particular sequences of phonemes.

In some examples, the language data 110 is closely related to the media 104 (as indicated by dashed line connecting media 104 to language data 110). For example, the language data may be based on text that is contextually related to the media (e.g., if the media is a newscast, reasonably close sources for similar language include newspapers and periodicals from the same geographic region and time period). In other implementations, the language data 110 represents a larger breadth of potential language represented in the media 104, derived, for example, from dictionaries, encyclopedias, newspapers, and literary works.

Continuing to refer to FIG. 1, the decoy generator 130 forms the decoy information 166 using a combination of language data processing that can be performed before a query is known, and processing that requires the particular query. Before the query is known (e.g., "offline") the decoy generator applies an internal language model generator 140 to the language data 110 to form an internal language model 146. When the query is known (e.g., "online") the decoy generator applies an internal query model generator 150 to the user's query 108 to form a query model 156. Then the internal language model 146 and the query model 156 are processed by a decoy processing module 160 to yield the decoy information 166. In some implementations, the internal language model 146 and the query model 156 are represented as Finite State Transducers (FST), and the processing and combination of the intermediate results is implemented as compositions of FSTs, which can be implemented very efficiently.

Figure 2:
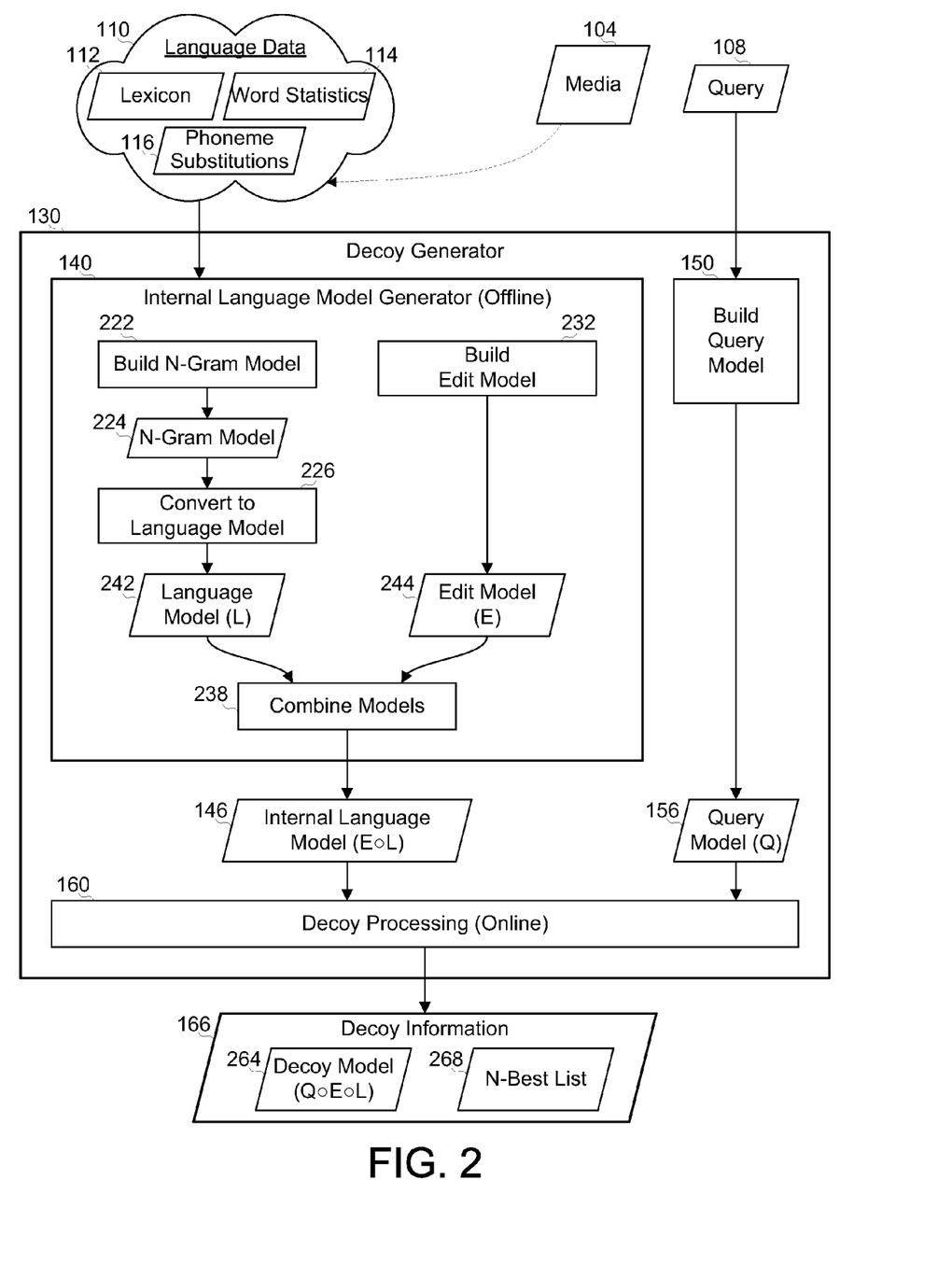
FIG. 2 is a block diagram of a portion of a word spotting system.
Figure 3A:
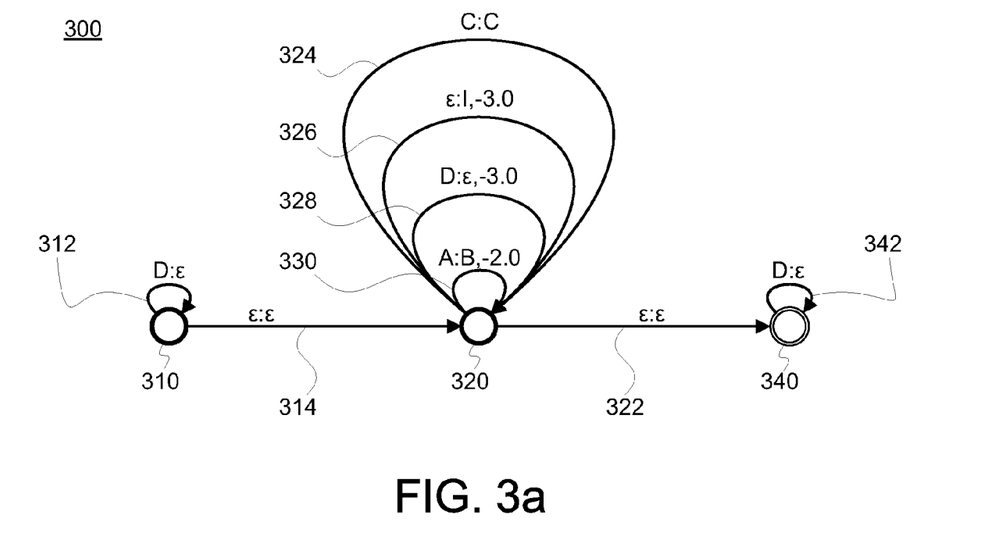
FIGS. 3a and 3b are Finite-State Transducers.
Figure 3B:
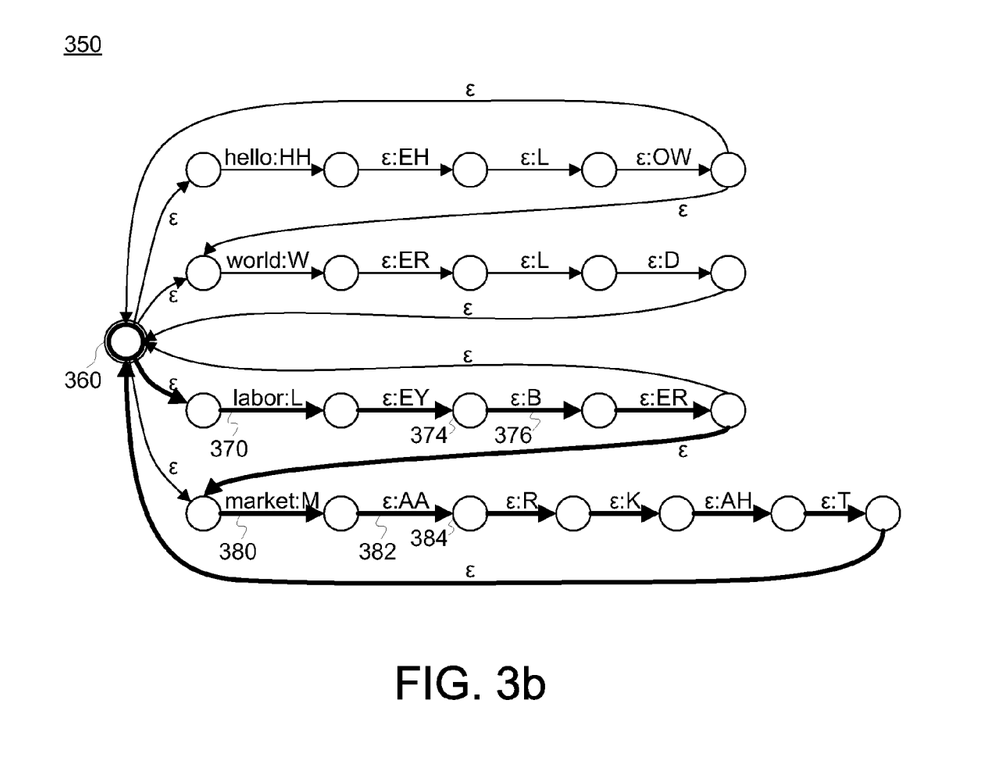

Referring to FIG. 2, an FST-based implementation of the decoy generator 130 uses processing involving a series of constructions and compositions of FST representations to yield the decoy information 166. A finite state transducer is a type of automaton that produces an output for transitions between states. Example representations of FSTs are shown in FIGS. 3a and 3b, both discussed in more detail below. Each state transition has an input and an output, either or both of which may be empty (usually denoted as epsilon r). State transitions may also each be weighted or associated with a score, such that the cumulative (e.g., additive) weight or score for a path can be compared to the cumulative weight or score for an alternative path.

One step of the process is to create an FST that represents the possible transcripts as an N-Gram model 224 at a word level. In some examples, the N-Gram model is a bigram language model with backoff weights. Such a bigram language model provides a good tradeoff between computational complexity and model effectiveness. Next, the word-level model is converted to an FST L (242) that accepts sequences of words as inputs and produces a series of phonemes as output. This transformation uses the lexicon 112 of the language data, which provides the pronunciation of each word. Certain arcs in the FST are weighted, in some examples according to log probabilities, such that a cost of a path through the FST is a sum of any weights on the arcs.

A simplified example of such a language model, which we denote by L, is shown in FIG. 3b. In FIG. 3b, the edges are denoted by <input>:<output>[,<weight>], where the default weight (which is omitted in the figure) is equal to zero. The start node is marked with a bold outline and the end node is marked with a double outline. If there is no label taken as input or output, this is denoted with an "$\epsilon$" (epsilon) label. In this example, the model is simplified to include four words ("hello", "world", "labor", and "market"), where each unigram has a weight of −1.0. There are two bigram edges that combine "hello world" and "labor market". This transducer takes word strings as input and produces phoneme strings and a score as output. For example, an input "hello world labor market" would output "hh eh l ow w er l d l ey b er m aa r k ah t" with a score of −2.0. In real systems, L would contain a much larger number of words and transitions.

Referring again to FIG. 2, another step (block 150), which is performed "online" once the query is known, is to form an FST representation of the query, Q 156. This is a simple transducer that admits as input the query term pronunciation with a score of 0. For systems that accommodate queries with multiple possible pronunciations, the different variations can be represented as a more complicated FST without any modification to the approach.

A composition of the language model L and the query model Q, represented as Q∘L, takes as input a sequence of words in the language and output a series of phonemes representing the query. However, because the query language model accepts only the pronunciation(s) of the query, the composition will only accept as input the word sequence representing the query, or possibly a homophone of the query.

In order to accommodate similar, but not necessarily identical pronunciations, an edit model E 224 is formed (block 232) from the phoneme substitution data 116 and is then used in a composition of three FSTs: Q∘E∘L. Generally, this composed FST accepts word sequences as input that have phoneme pronunciations such that at least part of the pronunciation matches the query pronunciation after applying some phoneme substitutions. Each of the paths through the resulting FST is weighted, such that the most likely decoy word sequences have the best path scores.

The edit model FST, E 244, provides a relationship between the phonetic media transcripts and the phonetic search query. Since the search query can start and end in the middle of a word, the system can skip phonemes at the start and the end of the decoy phrase. In addition, an exact match is not required. In some examples, a simple edit distance transducer is used where substitutions are given a weight of −2.0 and insertions and deletions are given a weight of −3.0. A schematic diagram of the combined transducer is shown in FIG. 3a. In the real system, these weights are different for each edge, for example, based on empirical phoneme confusion data from speech recognition systems. In some examples, the confusion data is used to derive probabilities of substitution, insertion, and deletion, and the weights are then computed as logarithms of those probabilities. In some examples, a common probability is computed for all substitutions, for all insertions, and for all deletions. In some examples, the probabilities are specific to particular edits or classes of edits. In other examples, the weights are assigned heuristically.

Referring to FIG. 3a, the simplified example of an FST edit model 300 has three states. For shorthand in the figure, the labels A, B, C, D, and I each represents every possible phoneme. An initial state (310) allows for deletion transition 312 and ready transition 314. This effectively ignores (deletes) phonemes preceding the match. When a match is ready, ready transition 314 changes the FST state to a central state (320). When the FST is finished the match, it will follow epilogue transition 322 to a final state (340). Final state 340 allows for deletion transition 342, effectively ignoring (deleting) phonemes subsequent to the match.

Within the central state (320), the FST allows for phoneme matches 324, phoneme insertions 326, phoneme deletions 328, and phoneme substitutions 330. Each transition has an associated cost (affecting the match score). A phoneme match 324 has no cost. An insertion 326 (replacing no phoneme $\epsilon$ with insertion phoneme I) has an insertion cost, e.g., −3.0. A deletion 328 (replacing phoneme D with no phoneme $\epsilon$) has a deletion cost, e.g., −3.0. And a substitution 330 (replacing phoneme A with phoneme B) has a substitution cost, e.g., −2.0. In some embodiments, each phoneme substitution pair has a cost tailored to the likelihood of substituting the specific phonemes in the pair. In some embodiments, each addition or deletion has a cost tailored to the likelihood of the addition or deletion (omission) of the phoneme. Thus there can be as many edit transitions as needed.

In some examples, the query model Q 156 is composed with the edit model E 244 to form an FST that accepts phoneme sequences that may be confused with the query by ignoring initial and final portions of the input phoneme sequence and applying substitutions, insertions, and deletions, according to the edit model.

Referring again to FIG. 2, preferably, the edit model E is applied to the language model L in an offline processing step (block 238) to form the composition E∘L an internal language model 146. Generally, this language model accepts word sequences in the language as input and produces exact or similar phoneme sequences as output, with the weight of a path through the composed FST representing both the likelihood of the word sequence as well as the cost of the phoneme substitutions.

Once the query model Q 156 and the internal language model E∘L 146 are available, they are combined (block 160) in a final composition to form a decoy model 264, F=Q∘(E∘L). This final transducer takes word sequences as input, and produces the query pronunciation and a phrase score as output. The better the score, the better the word sequence represents a decoy for the query.

In some examples, the decoy processing block 160 also produces an N-Best list 268 of unique input word sequences from this transducer to get scores for the top word sequences. In general, there may be a number of phrases that are good matches to the query phrase. For the "burma" example, the best path through L is highlighted in FIG. 3b. The total cost from this path is equal to −3.00 for the input string "labor market". In this case, a score of −1.00 is derived from the language model, and a score of −2.00 is derived from the substitution of "aa" in "market" for "ah" in "burma". The next highest scoring input is "world", which contains three substitutions and has a total score of −7.00.

Referring again to FIG. 1, the decoy aware word spotting search engine 120 searches the media 104 for the query 108. The engine 120 uses an initial word spotting search 122 to produce a raw putative hit list 124. Each putative hit in the raw putative hit list 124 is compared (block 170) against decoy information 166. In some embodiments, the internal language model 146 is reduced (e.g., as part of decoy processing 160) to a list of N decoy phrases most phonetically similar to the query, where N is a configurable number. Reduction of the model to an N-best list is based, for example, on a determination of paths through the model with the lowest weights. This is sometimes referred to as shortest-path analysis; general techniques for shortest-path analysis of an FST are well known. The vicinity of the media encompassing each raw putative hit is then rescored (block 174) according to each decoy on the N-best list in the decoy information 166. The rescoring encompasses a larger time window than the raw putative hit to accommodate decoy phrases that are longer than the query. Where a decoy phrase has a higher probability of matching to the location than the query, the hit is downgraded (174) as a likely false-positive. For example, the query score may be reduced by a fraction of the decoy score.

In some embodiments, a decoy phrase list 168 (e.g., the N-best list or a portion of the N-best list, for example, only the best decoy phrase 188) is returned (190) to the user at the time that the user specifies the query. This may be requested by the user, may be the default operation, or may be triggered by a condition. For example, a decoy phrase list 168 may be returned to the user 102 if the decoy phrases 188 are particularly common.

In some embodiments, the user may specify a query by identifying decoy phrases that desired putative hits should not match well. For example, the user may select from the decoy phrases identified by the system and/or may determine such decoy phrases based on other information, such as past experience or linguistically based considerations. As an example in which the user is looking for "Burma", the system may identify "labor market" as a likely decoy, and the user may have other reasons to expect that "suburban" may be a good decoy. The user then can define a query term to mean "an occurrence of 'Burma' that is not like 'labor market' or 'suburban'", which may in a an example of a query language be specified as NOTLIKE("Burma", "labor market", "suburban"). As another example, the user may specify NOTLIKE ("confirmation", "information", "reservation") when looking for true occurrences of the word "confirmation." As discussed below, in some implementations, decoys identified by the system are scored in the vicinity of a putative keyword and the score for the keyword is adjusted according to the score for the decoy, for example, by reducing the score of the keyword if the decoy scores well or otherwise comparing the score of the desired query term and the decoy terms. In some examples, decoys explicitly identified by the user, for example, using a NOTLIKE query, are handled differently than decoys identified by the system. For example, a putative hit for a keyword may have its score reduced to a greater degree for a decoy explicitly identified by the user than for system identified decoy. In some examples, the user's explicit enumeration of decoys is used to augment the set of decoys identified by the system, but the decoys are otherwise treated similarly. Note that in examples in which the NOTLIKE primitive is used in specifying a query, that primitive can be combine with other primitives, such as AND, OR, NOT, NEAR, etc., and the NOTLIKE primitive can be applied to individual terms in a query or to a query specification as a whole.

Generally, the putative hit list 180 is returned (190) to the user 102. In some embodiments, potential decoys detected 184 is also returned to the user, for example, to indicate likely false-positives. Returning decoys detected 184 also allows the user 102 to catch false-negatives (i.e., a desirable hit interpreted as a decoy). In addition, in some examples, in the case of false positives, the user can identify the decoy phrase that actually (or best) represents the media at the location and the system can then adapt its processing (for example, by improving its models) based on the identification of the correct phrase to improve the accuracy of further searches, such as further searches later in the same media of in other media.

Other embodiments of the approach may differ from the description above in certain features. For example, a different form of edit distance FST may be used. In the system described above, every substitution is given the same weight. However, many phonemes are more easily confused for others. For example, the substitution cost between "n" and "m" should be much lower than the difference between "ch" and "oy". For this reason it may be advantageous to set the weights for each phoneme substitution edge independently. If one has a phoneme confusion matrix for the wordspotter, one can make these weights proportional to the logarithm of the confusion matrix entry. In this method, highly confusable phoneme pairs will have weights much closer to zero than weights that are rarely confused. This is the case in the "burma" example, where the substitution from "aa" to "ah" should be given a relatively low weight due to the acoustic similarity between the two vowels.

In some implementations, computation of the final composition Q∘E∘L may result in a composed FST that is prohibitively large and slow to compute. However, since the FST for the query Q is acyclic, it is possible to perform a pruned composition that is very similar to Viterbi decoding. In this way, the final composed FST will have a smaller number of edges without degrading accuracy if the appropriate beamwidth is set appropriately.

In some implementations, a number of highly likely decoy phrases may be searched for at the same time as the query of interest. The resulting list can then be used to prune the initial results of a wordspotting search. In the example given above, the system would search for "labor market" in the same location as all putative hits for "burma". If the score for "labor market" is higher, these putative hits can be pruned from the result list. In this way the accuracy of the wordspotting system can be improved.

The foregoing approaches may be implemented in software, in hardware, or in a combination of the two. In some examples, a distributed architecture is used in which media is acquired (e.g., audio is recorded in digital form) and/or interaction with the user occurs at different locations (e.g., on different computers coupled by a data network) than the word spotting system, for example, using a distributed architecture. In examples in which some or all of the approach is implemented in software, instructions for controlling or data imparting functionality on a general or special purpose computer processor or other hardware is stored on a computer readable medium (e.g., a disk) or transferred as a propagating signal on a medium (e.g., a physical communication link).

It is to be understood that the foregoing description is intended to illustrate and not to limit the scope of the invention, which is defined by the scope of the appended claims. Other embodiments are within the scope of the following claims.

What is claimed is:

1. A computer implemented method for processing media comprising:
    using a computer to perform the steps of:
        accepting the media;
        accepting language data;
        accepting a query;
        processing the query using the language data to identify one or more language patterns each having a length larger than a length of a language pattern of the query, each language pattern including a first portion that is acoustically similar to the language pattern of the query and a second portion that is not acoustically similar to the language pattern of the query;
        locating a putative instance of the query in the media, the putative instance being associated with a first time interval in the media, the locating including determining a match score for the located putative instance of the query to the media in the first time interval;
        selecting a second time interval of the media according to the first time interval, the second time interval being larger than and including the first time interval;
        determining a degree of acoustic similarity between the media in the second time interval and one or more of the identified language patterns;
        determining a score for the putative instance according to the match score for the located putative instance of the query and to at least one score associated with the determined degree of acoustic similarity between the media in the second time interval and one or more of the identified language patterns; and
        providing data characterizing the putative instance of the query according to the determined degree of acoustic similarity, including identifying the putative instance of the query as a potential falsely identified instance of the query based on the determined score for the putative instance.

2. The method of claim 1 wherein providing data characterizing the putative instance includes providing data representing a visual display of the putative instance and at least some of the language patterns.

3. The method of claim 1 wherein determining the degree of acoustic similarity between the media in the second time interval and one or more of the identified language patterns includes determining a match score for each of the language patterns to the media in the second time interval.

4. The method of claim 3 wherein determining the score for the putative instance according to the determined degree of acoustic similarity includes combining the match score for the query and match scores for one or more of the language patterns.

5. The method of claim 4 wherein processing the query using the language data to identify one or more language patterns that each include the first portion of the pattern that is acoustically similar to the query includes accepting a specification of at least some of said patterns with a specification of the query.

6. The method of claim 4 wherein processing the query using the language data to identify one or more language patterns that each include the first portion of the pattern that is acoustically similar to the query includes identifying at least some of said patterns as phonetically similar to at least a portion of the query.

7. The method of claim 1 wherein processing of the query using the language data to identify one or more language patterns that each include the first portion of the pattern that is acoustically similar to the query is performed prior to locating the putative instance of the query.

8. The method of claim 7 wherein the method further comprises presenting the one or more language patterns to a user from whom the query is accepted.

9. The method of claim 8 wherein presenting the one or more patterns to the user includes determining a degree of similarity of each of the patterns to the query.

10. The method of claim 7 wherein determining the degree of acoustic similarity between the media in the second time interval and one or more of the identified language patterns is performed after locating the putative instance.

11. The method of claim 1 wherein providing data characterizing the putative instance of the query according to determined degree of acoustic similarity includes providing data representing the putative instance and at least some of the language patterns, and the method further comprises accepting an indicator that one of the language patterns represents the media in the location of the query.

12. The method of claim 11 wherein the method further comprises adapting a configuration of a wordspotting engine according to the accepted indicator to improve an accuracy of locating further putative instances of the query.

13. The method of claim 1 wherein processing the query using the language data to identify one or more language patterns that each include the first portion of the pattern that is acoustically similar to the query includes accepting a specification of at least some of said patterns with a specification of the query.

14. The method of claim 1 wherein processing the query using the language data to identify one or more language patterns that each include the first portion of the pattern that is acoustically similar to the query includes combining word information and phoneme substitution information with a phonetic representation of the query.

15. The method of claim 1 wherein processing the query using the language data to identify one or more language patterns that each include the first portion of the pattern that is acoustically similar to the query includes identifying language patterns that include a portion that is phonetically similar to the query.

16. The method of claim 1 wherein processing the query using the language data to identify one or more language patterns that each include the first portion of the pattern that is acoustically similar to the query includes identifying one or more word sequences.

17. The method of claim 1, wherein processing the query using the language data to identify one or more language patterns that each include the first portion of the pattern that is acoustically similar to the query includes identifying at least one language pattern such that the query is similar to a portion less than the entire language pattern.

18. The method of claim 1, wherein the one or more language patterns phonetically similar to the query are represented as a finite state transducer.

19. The method of claim 1, wherein processing the query using the language data to identify one or more language patterns that each include the first portion of the pattern that is acoustically similar to the query comprises selecting N best language patterns from representation of a larger plurality of language patterns.

20. The method of claim 19, wherein the representation of the larger plurality of language patterns comprises a finite-state transducer and selecting the N best language patterns comprises identifying multiple paths through the transducer.

21. The method of claim 1 wherein the query includes a sequence of one or more words having a phonetic representation and each identified language pattern of the one or more language patterns includes a part that is phonetically similar to the query.

22. The method of claim 1 wherein each of the one or more language patterns includes a first plurality of phonemes, the language pattern of the query includes a second plurality of phonemes, and a number of phonemes in the first plurality of phonemes is larger than a number of phonemes in the second plurality of phonemes.

23. Software stored on non-transitory computer-readable media comprising:
instructions for causing a data processing system to:
accept media;
accept language data;
accept a query;
process the query using the language data to identify one or more language patterns each having a length larger than a length of a language pattern of the query, each language pattern including a first portion that is acoustically similar to the language pattern of the query and a second portion that is not acoustically similar to the language pattern of the query;
locate a putative instance of the query in the media, the putative instance being associated with a first time interval in the media, the locating including determining a match score for the located putative instance of the query to the media in the first time interval;
select a second time interval of the media according to the first time interval, the second time interval being larger than and including the first time interval;
determine a degree of acoustic similarity between the media in the second time interval and one or more of the identified language patterns;
determine a score for the putative instance according to the match score for the located putative instance of the query and to at least one score associated with the determined degree of acoustic similarity between the media in the second time interval and one or more of the identified language patterns; and
provide data characterizing the putative instance of the query according to the determined degree of acoustic similarity, including identifying the putative instance of the query as a potential falsely identified instance of the query based on the determined score for the putative instance.

24. A media processing system comprising:
an input for accepting media;
an input for accepting language data;
and input for accepting a query;
a computer implemented module for processing the query using the language data to identify one or more language patterns each having a length larger than a length of a language pattern of the query, each language pattern including a first portion that is acoustically similar to the language pattern of the query and a second portion that is not acoustically similar to the language pattern of the query;
a computer implemented word spotting module including a first word spotting component for accepting media and locating a putative instance of the query in the media, the putative instance being associated with a first time interval in the media, the locating including determining a match score for the located putative instance of the query to the media in the first time interval; and
a computer implemented second component for selecting a second time interval of the media according to the first time interval, the second time interval being larger than and including the first time interval; determining a degree of acoustic similarity between the media in the second time interval and one or more of the identified language patterns; and determining a score for the putative instance according to the match score for the located putative instance of the query and to at least one score associated with the determined degree of acoustic similarity between the media in the second time interval and one or more of the identified language patterns; and
a computer implemented third component for providing data characterizing the putative instance of the query according to the determined degree of acoustic similarity, including identifying the putative instance of the query as a potential falsely identified instance of the query based on the determined score for the putative instance.

* * * * *